Feb. 13, 1923.

O. H. HANSEN

BLANCHER

Filed Jan. 15, 1921

INVENTOR.
O. H. Hansen
BY
W. H. Lieber
ATTORNEY.

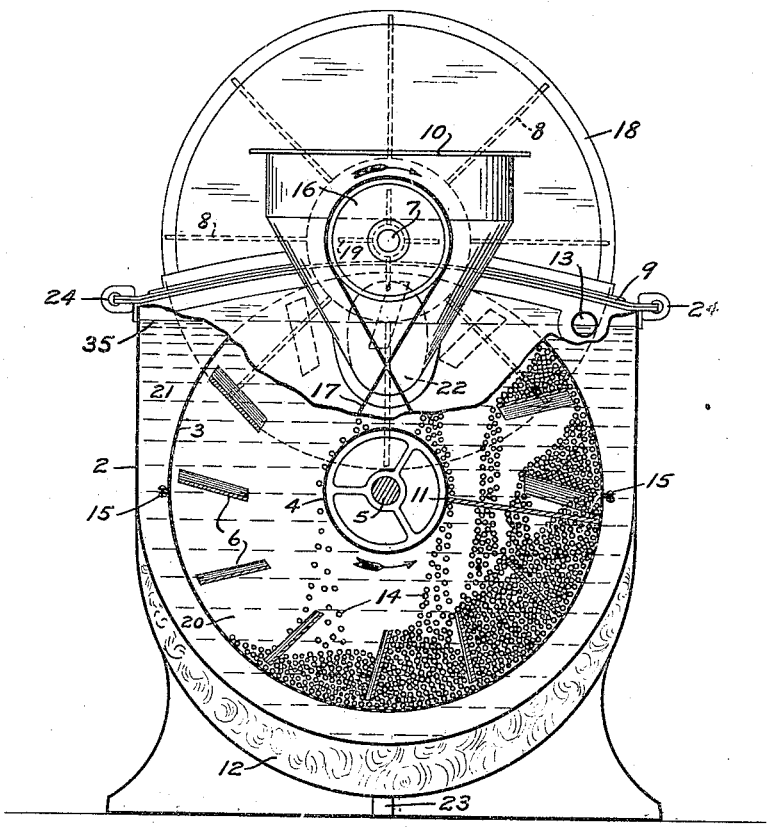

Patented Feb. 13, 1923.

1,445,276

UNITED STATES PATENT OFFICE.

OSWALD H. HANSEN, OF PORT WASHINGTON, WISCONSIN, ASSIGNOR, BY DIRECT AND MESNE ASSIGNMENTS, TO HANSEN CANNING MACHINERY CORPORATION, A CORPORATION OF WISCONSIN.

BLANCHER.

Application filed January 15, 1921. Serial No. 437,526.

*To all whom it may concern:*

Be it known that OSWALD H. HANSEN, a citizen of the United States, residing at Port Washington, in the county of Ozaukee and State of Wisconsin, has invented a certain new and useful Blancher, of which the following is a specification.

This invention relates in general to improvements in the art of treating edible substances such as fruits and vegetables prior to packing them in sealed containers, and relates more specifically to improvements in the construction and operation of blanchers for treating green peas or similar granular commodity, preparatory to packing and sealing the same in cans.

A general object of the invention is to provide a blancher which is simple and compact in construction and which is automatic and efficient in operation.

It has been found in the industry of packing or canning vegetables such as green peas, where the grade and quality of the peas as delivered to the canning factory vary throughout a considerable range, that a relatively uniform and high quality of pack is attainable only by careful and efficient blanching of the commodity prior to packing it in the cans. The operation of blanching comprises thorough washing and heating of the product for a period of time which must be varied in accordance with the characteristics of the peas which are to be treated. Small and naturally tender peas require little treatment, and are blanched merely to remove mucinous substances and coloring matter which might produce undesirably roily liquor. In proportion to the size and hardness of the peas, a greater degree or longer period of blanching becomes necessary, in order in addition to removing mucinous substances and coloring matter, to eliminate bitter substances and to produce uniform tenderness. Over-blanching is however, undesirable as it causes the peas to burst due to the expansion of starch therein, thus making a perfect blanch the only method of producing uniform and high grade product.

One of the more specific objects of the present invention is to provide a blancher which will produce more uniform and higher grade product than has been attainable with the prior devices, by enabling more thorough and efficient treatment of the granular substance or peas.

Another specific object of the invention is to provide an exceedingly compact automatic blanching device having enormous capacity.

A further specific object of the invention is to provide means whereby the interior of a blancher may be readily maintained in sanitary condition, such means consisting of the provision of a structure in which internal parts are accessible and removable for cleaning and sterilizing.

An additional specific object of the invention is to provide a blanching machine which may be manufactured, installed and operated at minimum cost, and which may be quickly assembled and dismantled.

Still another specific object of the invention is to provide for the conservation of heat in blanching and like heating apparatus, by providing instrumentalities for utilizing the excess heat units contained in the blanching agency discharged from the machine to preliminarily heat the entering agency.

These and other objects and advantages of the blancher forming the subject of the present invention, will be apparent in the course of the following description, wherein the term "peas" is intended to be descriptive of any commodity having characteristics similar to those of green peas.

A clear conception of an embodiment of the invention and of the operation of a device constructed in accordance therewith, may be had by referring to the drawings accompanying and forming a part of this specification, in which like reference characters designate the same or similar parts in the several views.

Fig. 1 is a somewhat diagrammatic part sectional side elevation of a blancher for peas and the like.

Fig. 2 is a somewhat diagrammatic part sectional end elevation of a blancher for peas and the like, the section being taken along the line II—II of Fig. 1, looking in the direction of the arrows.

Figure 1:
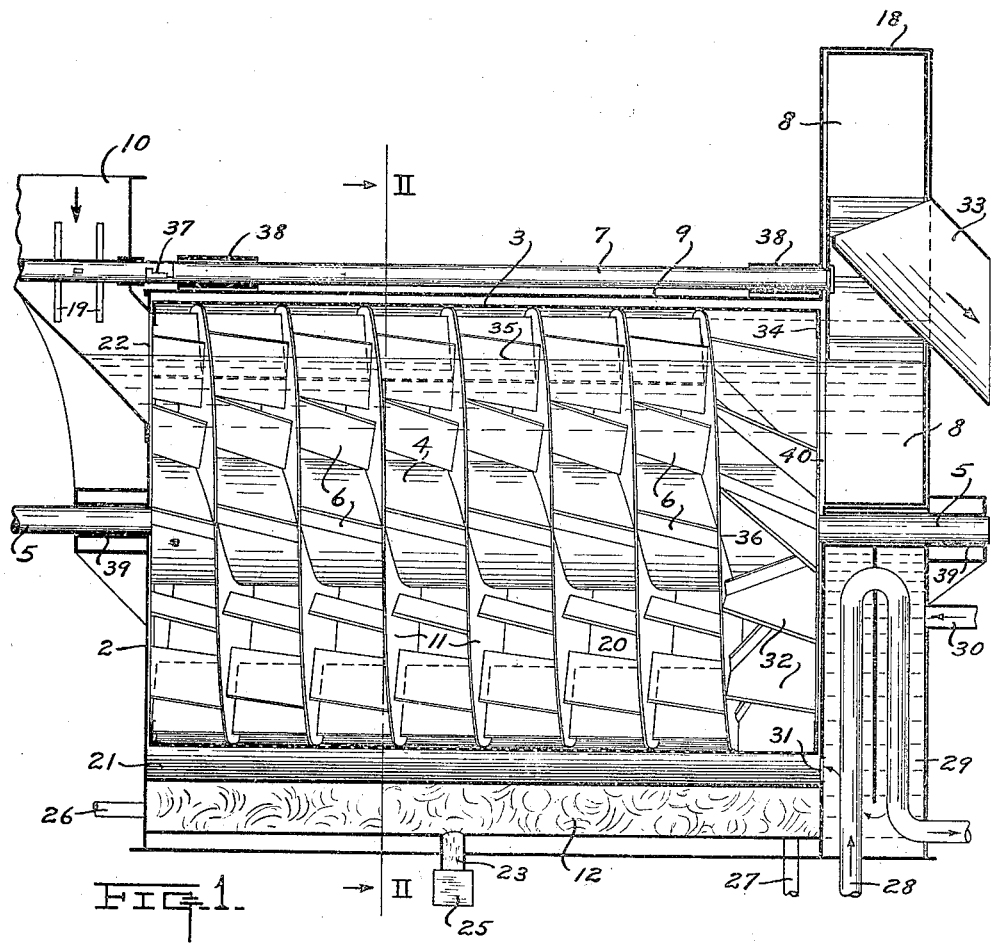

The blanching machine comprises in general a main casing 2, a hopper 10 for delivering granular material such as peas to one end of the casing 2, a rotor having radiating vanes 8 for delivering the granular material from the opposite end of the casing 2, and means within the casing 2 for simultaneously rapidly urging the material along the casing and for thoroughly but gently agitating it during its transportation.

The casing 2 preferably has a bottom of semicylindrical form and is provided with a fresh water inlet 31 near the lower portion of the granular material discharge end, and with a water outlet 13 near the upper portion of the granular material inlet end thereof. The top of the casing 2 is preferably provided with a readily removable cover 9 which may be formed either of one piece and secured to the casing by means of clamps 24, or which may be split along the center and the two halves hinged to the upper edges of the casing. This cover 9 permits ready access to all portions of the chamber 21 within the casing 2. The granular material supply hopper 10 is preferably secured to an end of the casing 2 and has therein a rotary agitator 19 for preventing bridging of the peas across the hopper 10. The hopper 10 communicates with the interior of the casing 2 through an opening 22 located near the top of the casing 2. The granular material discharge rotor formed by the radiating vanes 8, is secured to the end of a shaft 7 which is mounted in bearings 38 secured to the cover 9. The shaft 7 is provided with a releasing coupling 37 for permitting the cover 9 to be raised without disturbing the hopper 10. The rotor vanes 8 are revoluble within a cylindrical horizontally split casing 18, the upper half of which is secured to and movable with the cover, and the lower half of which is fastened to the end of the stationary casing 2. The interior of the casing 18 communicates with the interior of the casing 2 through a semi-circular opening 40 at the upper discharge end of the casing 2. The radiating vanes 8 which may be perforated in order to prevent discharge of liquid from the chamber 21, are adapted to receive granular material from the interior of the casing 2, to elevate the granular material, and to finally deliver the treated material from the machine through a discharge spout 33.

The agitating and transporting means located in the chamber 21 of the casing 2, comprises a sectional perforated cylindrical drum 3 having opposite open ends, one or more helical vanes 11 having outer edges closely fitting the interior of the drum 3, an imperforate central drum 4 coacting with the inner edges of the helical vanes 11, a helical series of elevating and transporting vanes 6 connecting the successive helices of the vanes 11, an elevating and discharging device at the discharge end of the drum 3, and a horizontal shaft 5 secured to the central drum 4. The perforated cylindrical drum 3 is preferably formed in half sections which are firmly united by means of quick release clamps 15 so that the sections of the drum 3 may be rapidly removed. The helical vanes 11 may be perforated if desired, but as disclosed are imperforate and extend from the inlet end of the drum 3 up to the elevating and discharging device at the opposite drum end. These helical vanes 11 form one or more continuous helical chambers 20 extending longitudinally of the drum 3. The central drum 4 is of a length substantially equal to that of the outer drum 3, the two drums being concentric relatively to each other and being simultaneously rotatable by means of the shaft 5. The elevating and transporting vanes 6 are inclined longitudinally of the drums 3, 4 as indicated in Fig. 1, and are substantially tangent to the inner drum 4 as indicated in Fig. 2. These vanes 6 are spaced from the inner surface of the drum 3 a slight amount but are located a considerable distance away from the central drum 4. The elevating and discharging device located at the discharge end of the drums 3, 4 comprises an annular series of pockets formed by inclined plates or vanes 32, the end 36 of the helical vane 11, and a flange 34 secured either to the drum 3 or to the ends of vanes 32. The agitating and transporting rotor is substantially submerged in the liquid 35 within the chamber 21. The rotor shaft 5 is rotatable from any convenient source and is mounted in bearings 39 secured to the opposite ends of the casing 2. The shafts 5, 7 are parallel to each other and are drivingly connected in any suitable manner as by a belt 17 and pulleys 16, or by means of toothed or chain gearing. The rotation of the shafts 5, 7 is preferably as indicated by the arrows in Fig. 2. It is also obvious that the driving means for the rotor vanes 8 may be located at the discharge end of the machine instead of at the inlet end thereof.

The main casing 2 is preferably jacketed by means of a chamber 12 to which a heating agent such as steam may be admitted and exhausted through pipes 26, 27. The jacketing chamber 12 may be provided with a drain 23 communicating with a separator 25. The overflow or wash water outlet 13 preferably communicates with a heating pipe or coil 28 which passes through a heating chamber 29. The fresh water admitted to the blancher is admitted to the chamber 29 through a pipe 30 and after flowing in contact with the heating coil 28, is admitted to the chamber 21 through the opening 31.

During the normal operation of the blancher, rotary motion is being imparted to the shafts 5, 7 to produce rotary motion of the main rotor within the chamber 21, of the agitator 19 and of the discharge rotor vanes 8, as indicated by the arrows in Fig. 2. The granular material or peas 14 are continuously admitted to the hopper 10 while the casing 2 is substantially filled with liquid 35. Steam or other heating agent is admitted to the jacket chamber 12 and heats the liquid 35. As the peas 14 pass through the opening 22 they drop in succession into the helical chamber 20 of the main rotor and descend through the washing and blanching liquid 35 to the bottom of the drum 3. The advancing revolving vanes 6 pick up batches of the peas thus deposited at the bottom of the drum 3 and simultaneously elevate and transport them longitudinally of the drum, the extent of such transportation being limited by the adjacent helix of the vane 11. When the peas 14 have been elevated by the upwardly moving vanes 6, as shown in Fig. 2, they are gradually showered or cascaded through the liquid 35 within the helical chamber 20. As the falling peas move downwardly they are further advanced by the helical vanes 11 until they again reach the bottom of the drum 3 whereupon they are again elevated and subsequently cascaded through the liquid until they eventually reach the elevating and discharging device at the end of the blanching rotor. Upon reaching the helix end 36, the peas 14 are dropped into the elevating pockets whereupon the revolving vanes 32 lift them and deliver them above the shaft 5 into the path of travel of the revolving vanes 8. The vanes 8 elevate the peas within the casing 18 and ultimately deliver them from the machine through the discharge spout 33. The peas 14 are thus simultaneously transported rapidly through the machine and thoroughly treated, the operation automatically continuing as long as peas 14 are delivered to and from the feed hopper 10.

By intermittently elevating and showering the peas 14 through the washing and blanching liquid 35 with the aid of the vanes 6, absolutely uniform and highly efficient treatment is attained. This manner of treatment of the peas, also enables reduction of the machine to minimum length due to the intimate contact of the peas and liquid, thus requiring less floor space than is necessary with the machines of the prior art. The desired period of washing and blanching is readily secured by varying the speed of rotation of the shaft 5 to suit the condition or characteristics of the product under treatment. The vanes 6, 11 effect rapid transportation of the peas along the drum 3 while the spacing of the vanes 6 from the drum 3 positively eliminates injury of the product. This space adjacent to the outer edges of the vanes 6, permits the peas which might otherwise tend to stick between the vane and the drum 3, to roll freely along the inner wall of the drum, and also eliminates crushing of the floating peas which are caught by the advancing vanes 6 as they sweep along the surface of the liquid 35. The elevating and discharging vanes 32 together with the revolving discharge vanes 8 permit substantially complete submergance of the blanching rotor.

The provision of a removable cover 9 and the formation of the drum 3 in sections, permits ready access to all portions of the interior of the blancher so that the same may be maintained in sanitary condition. It will be obvious that the greater part of the machine may be formed of sheet metal, and that the parts which engage the product may be enameled or otherwise coated in order to assist maintainance of sanitary conditions. The machine as a whole requires very little power for its operation, and is entirely automatic after having been properly started.

By suitably controlling the steam admitted to the jacketing chamber 12 surrounding the bottom of the blancher, the washing and blanching liquid 35 may be readily maintained at any desired temperature. The hot liquid leaving the blancher is passed through the heating coil 28 thereby preliminarly heating the entering liquid and eliminating waste of the heat units contained in the liquid leaving the overflow 13. The chamber 29 may be provided with suitable baffles which compel the liquid admitted through the inlet 30 to flow along the heating coil 28 thus reducing the temperature of the leaving liquid to substantially that of the entering liquid.

Due to the relatively diagrammatic disclosure of the invention, it must be obvious that many minor details have been omitted, such omission having been deemed desirable in order to avoid complicating the disclosure. It should be understood that it is not desired to limit the invention to the exact details of construction and of operation herein shown and described, for obvious modifications within the scope of the claims may occur to persons skilled in the art.

It is claimed and desired to secure by Letters Patent:—

1. In combination, a casing forming a chamber, a drum rotatable within said chamber, a helical member located within said drum, and elevating vanes connecting the successive helices of said member, said vanes being spaced from the inner surface of said drum.

2. In combination, a casing forming a chamber, and a helical series of elevating vanes revoluble in said chamber about an axis extending longitudinally of said casing, said vanes being adapted to precipitate material over their inner and outer edges.

3. In combination, a casing forming a chamber, means for admitting liquid to said chamber, and a helical series of elevating vanes revoluble through said liquid about an axis extending longitudinally of said chamber, said vanes being adapted to precipitate material over their inner and outer edges.

4. In combination, a casing forming a chamber, means for admitting liquid to said chamber, a drum rotatable in said liquid, means for feeding granular material into said drum, means for urging said material through said drum, means for delivering said material from said drum above the axis thereof, and means for discharging material delivered from said drum from said casing above the highest portion of said drum.

5. In combination, a casing forming a chamber, means for admitting liquid to said chamber, a rotary drum substantially submerged within said liquid, means for feeding granular material into said drum, means for urging said material along said drum, means for delivering said material from said drum above the axis of rotation thereof, and means for discharging material delivered from said drum from said casing above the highest portion of said drum.

6. In combination, a casing forming a chamber, means for admitting liquid to said chamber, a drum rotatable in said liquid, a helical member and transverse vanes for urging granular material along said drum, means for delivering said material from said drum above the axis thereof, and means for discharging material delivered from said drum from said casing above the highest portion of said drum.

7. In combination, a casing forming a chamber, a drum rotatable in said chamber, means for feeding granular material into said drum, elevating vanes rotatable about the axis of said drum for delivering said material from said drum above the axis thereof, and a series of elevating vanes rotatable about an axis located above the axis of said drum for discharging material delivered from said drum from said casing above the highest portion of said drum.

8. In combination, a casing forming a chamber, means for admitting liquid to said chamber, a rotary drum substantially submerged in said liquid, means for feeding granular material into said drum, elevating vanes rotatable with said drum for delivering said material from said drum above the axis thereof, and a series of elevating vanes rotatable about an axis located above the axis of said drum for discharging material delivered from said drum from said casing above the level of liquid therein.

9. In combination, a casing forming a chamber, a perforated cylindrical drum rotatable within said chamber, and a helical series of elevating vanes rotatable with said drum, said vanes being spaced from the inner surface of said drum.

10. In combination, a casing forming a chamber, a drum rotatable within said chamber, and a helical series of elevating vanes within said drum, each of said vanes being spaced from said drum and inclined relatively to the axis of rotation of said drum.

11. In combination, a casing forming a chamber, a perforated drum rotatable within said chamber, and a helical series of inclined elevating vanes within said drum, said vanes being spaced from the inner surface of said drum.

12. In combination, a casing forming a chamber, a perforated tubular member rotatable within said chamber, and a succession of inclined elevating vanes within said member, said vanes being spaced from the inner surface of said member and being adapted to urge material from one end of said member toward the other.

13. In combination, a casing forming a chamber, a sectional drum rotatable and enclosed within said chamber, and a helical member within said drum, said member being freely removable upon removal of a section of said drum.

14. In combination, a blancher rotor comprising a perforated drum formed of halves, means for urging material along the drum, means for removing one of said drum halves to permit access to said urging means, and means for rotatably supporting said drum.

15. In combination, a blancher rotor comprising a perforated drum, and a helical series of elevating vanes secured to and spaced from said drum, said vanes being inclined relatively to the axis of said drum and extending longitudinally thereof.

16. In combination, a blancher rotor comprising a perforated drum, a helical member located within said drum, and a series of elevating vanes supported only by the successive helices of said member.

17. In combination, a blancher rotor comprising a perforated drum, and a helical series of elevating vanes within said drum, said vanes being spaced from the interior surface of said drum.

18. In combination, a casing, a rotor within said casing, means for feeding granular material to the interior of said rotor, and means for effecting access to all portions of said rotor without disturbing said feeding means.

19. In combination, a casing, a rotor within said casing, means for feeding granular material to said rotor, a second rotor for delivering said material from said first mentioned rotor, and means for simultaneously effecting access to said first mentioned rotor and removal of said second rotor.

20. In combination, a casing, means for substantially filling said casing with liquid, means for admitting granular material to an upper portion of said casing, and means for delivering said granular material from within said casing to a point above the same without removing liquid from said casing.

21. In combination, a casing, means for substantially filling said casing with liquid, means for admitting granular material to an upper portion of said casing, means for simultaneously cascading said material through said liquid and for urging the material from end to end of said casing, and means for delivering said material from within said casing at a point above and without removing said liquid.

22. In combination, a casing, means for admitting liquid to said casing, means for heating said liquid within said casing, and means for utilizing the heated liquid delivered from said casing to preliminarily heat the entering liquid.

23. In combination, a casing, means for admitting liquid to said casing, means for urging granular material through the liquid within said casing, and means for utilizing liquid discharged from said casing to preliminarily heat the liquid admitted to said casing.

24. In combination, a casing, means for substantially filling said casing with liquid, means for showering and for urging material through said liquid, means for heating the liquid within said casing, and means for utilizing liquid discharged from said casing to heat the liquid admitted thereto.

25. In combination, a casing substantially filled with liquid, a helical transporting member substantially completely submerged within said liquid, elevating vanes located between successive flights of said helical member, means for delivering granular material into the path of said flights, and means for discharging said material from said path to a point above the level of said liquid.

In testimony whereof, the signature of the inventor is affixed hereto.

OSWALD H. HANSEN.